United States Patent
Farago

(10) Patent No.: US 7,081,966 B2
(45) Date of Patent: *Jul. 25, 2006

(54) DEMONSTRATION CONTROL ADJUNCT DEVICE FOR PRINTERS

(76) Inventor: Steven Farago, 140 Crow Hill Rd., Mount Kisco, NY (US) 10549

( * ) Notice: Subject to any disclaimer, the term of this patent is extended or adjusted under 35 U.S.C. 154(b) by 0 days.

This patent is subject to a terminal disclaimer.

(21) Appl. No.: 10/731,764

(22) Filed: Dec. 9, 2003

(65) Prior Publication Data

US 2004/0120005 A1 Jun. 24, 2004

Related U.S. Application Data

(62) Division of application No. 09/187,267, filed on Nov. 6, 1998, now Pat. No. 6,747,752.

(51) Int. Cl.
*G06F 15/00* (2006.01)
(52) U.S. Cl. .................................. 358/1.15; 358/1.1
(58) Field of Classification Search ............ 358/1.1, 358/1.2, 1.3, 1.4, 1.5, 1.6, 1.7, 1.8, 1.9, 1.11, 358/1.12, 1.13, 1.14, 1.15; 400/61, 70; 705/14, 705/15, 16, 17, 20
See application file for complete search history.

(56) References Cited

U.S. PATENT DOCUMENTS

| | | | | | |
|---|---|---|---|---|---|
| 4,900,904 | A | * | 2/1990 | Wright et al. | 235/381 |
| 5,368,129 | A | * | 11/1994 | Von Kohorn | 186/52 |
| 5,550,985 | A | * | 8/1996 | Miller et al. | 713/324 |
| 5,557,721 | A | * | 9/1996 | Fite et al. | 705/14 |
| 5,926,795 | A | * | 7/1999 | Williams | 705/14 |
| 6,024,288 | A | * | 2/2000 | Gottlich et al. | 235/493 |
| 6,042,278 | A | * | 3/2000 | Spencer et al. | 400/61 |
| 6,076,068 | A | * | 6/2000 | DeLapa et al. | 705/14 |
| 6,193,152 | B1 | * | 2/2001 | Fernando et al. | 235/380 |
| 6,216,112 | B1 | * | 4/2001 | Fuller et al. | 705/14 |
| 6,317,784 | B1 | * | 11/2001 | Mackintosh et al. | 709/219 |

* cited by examiner

*Primary Examiner*—Gabriel Garcia
(74) *Attorney, Agent, or Firm*—Israel Nissenbaum

(57) ABSTRACT

A printer, such as an ink-jet or laser printer is provided with a demonstration and activation member to illustrate operability of the printer. The print out is randomly, sequentially or a combination selected by a selection device to contain one or more selected value additions such as coupons for discount pricing for the printer itself, peripheral and the like, whereby the demonstration user keeps, rather than discards the print out.

7 Claims, 4 Drawing Sheets

DEMONSTRATION CONTROL ADJUNCT DEVICE FOR PRINTERS

FIELD OF THE INVENTION

This invention relates to printers and particularly ink-jet and laser type printers used with computers which are configured to provide demonstration pages which illustrate the operation thereof.

BACKGROUND OF THE INVENTION

Computer printers, particularly new or popular models, are often displayed in stores, at sales presentation, at shows, exhibitions and the like, for actual demonstration and enticement for possible unit or bulk purchase. In order to demonstrate the capability of a printer (currently many of such demonstrations relate specifically to operation of ink jet and laser type printers), for features such as speed, color, resolution, and clarity, particularly related to a specific price category and intended use (e.g., professional, home, graphics design, desk-top publishing, office, etc.) the printer is often self pre-programmed to print out a pre-designed demonstration page, carefully set up to highlight the positive aspects of the printer's capability.

These demonstration pages are undated (except for a possible copyright notice) and are rarely changed throughout the marketing run life of the printer model. At the end of the demonstration the user walks away from the printer with the demonstration page in hand which, once examined and possibly compared, is often discarded.

SUMMARY OF THE INVENTION

It is accordingly an object of the present invention to provide a printer and particularly an ink jet or laser printer with external, interfaced means for generating a demonstration printer output coupled with an intrinsic value whereby a demonstration user retains all or part of the demonstration output.

It is a further object of the present invention to provide such generation means with mechanical activation means and random, sequential or a combination selection means for providing demonstration output pages with different outputs.

It is yet another object of the present invention to provide such demonstration outputs with both visual indication of printer capability and a redeemable premium such as a coupon.

It is still yet another object of the present invention to provide means for changing and/or updating the redeemable premium printout particularly if time restricted.

Generally the present invention comprises a printer demonstration adjunct device adapted for connection to an input interface of a printer such as to a serial, parallel or other input port. The device is adapted to cause the printer to print out both demonstration capability images and text, demonstrating 10 the operation of the specific printer connected thereto. In addition, the device is adapted to cause printout of value added material, such as price-off coupons or redemption of premiums as a reward for viewing the demonstration materials, in conjunction with or integral with the demonstration materials.

The adjunct device comprises the following elements: a) a memory module, b) a logic module, c) an interface connector and d) an optional power circuit.

The memory module can be a fixed or removable, pre-programmed or programmable storage device. In case of removable memory module the adjunct device comprises a removable module or similar device having interface means for connection to the control input of the printer, and optionally is able to effect power diversion from the power supplied to the printer to power itself thereby.

The logic module comprises an address generator and sequencer, and a clock oscillator, to effect appropriate printout from stored memory and handshake logic adapted for the specific printer to which it is attached. The logic module may also contain a generator that causes selection of demonstration images randomly, sequentially or any combination of these, coupled with selected value added images, such as of coupons for various items or purchase conditions, coupons for discounts or even free selected computer hardware, software, or even the printer itself (or tie-ins with other items or services), and the like. The coupons may be time limited and accordingly the value added images must be changeable, in such embodiment, to accommodate updated images and expiration dates. The adjunct device also can be used to print a fixed, single demonstration page containing one or more value added images. The adjunct device, the logic module or part of the adjunct device may be built into one or more custom ASIC chips (application specific integrated circuit) that include all relevant functions.

The above and other objects, features and advantages of the present invention will become more evident from the following discussion and drawings in which:

DETAILED DESCRIPTION OF THE INVENTION

In accordance with the present invention the demonstration adjunct device is provided with hardware and programming means for controlling the printer. This is embodied in either exchangeable ROM software, or RAM with accessing means for the updating and change thereof, for controlling the printer attached thereto to print a standard type printer demonstration page with demonstration of printer capability and as part of the page also providing one or more redeemable coupons or promotional literature adapted to induce the user to retain the demonstration page. Other items such as bar codes and the like may be included therein. The programming means is configured to combine a standard demonstration page with either a single preset value added printout or with a preset series of value added printout materials from which one or more are selected for printout either randomly, sequentially or a combination of these. Alternatively, the demonstration page and the value added portion are separated sheets.

In an embodiment of the present invention a series of printers, such as from a single manufacturer in a display are each provided with the demonstration adjunct device of the present invention with said adjunct device having been programmed to print different random coupons which must be linked to obtain valid redemption of an item, i.e., the user is forced to try an entire series of printers (or products linked with printers) to obtain linked redeemable coupons.

The memory module of the adjunct device may be a fixed or removable, programmable storage device. In the embodiment wherein it is removable, a suitable connector socket is integrated with the device in order to accommodate the memory module. The memory unit comprises two sets of pre-programmed information:

1) Printer control codes of the presentation (i.e., demonstration) image(s) and/or value added images, such as of coupons of various items or with purchase conditions or options;
2) Control codes for the adjunct operation, as used by the logic module.

The logic module comprises an address generator, and sequencer, a clock oscillator, and handshake logic adapted for the specific printer to which it is attached. The module may also contain a random, sequential or a combination generator that causes the selection of demonstration images (or a single demonstration image), coupled with selected value added images. The logic module is preferably built into a single ASIC custom chip (application specific integrated circuit) that includes all or parts of the functions of the adjunct device.

The interface connector provides connection means between the adjunct device and the printer.

The power circuit contains power diversion means for utilizing power provided to the printer by its power input.

DETAILED DESCRIPTION OF THE DRAWINGS AND THE PREFERRED EMBODIMENTS

Figure 1:
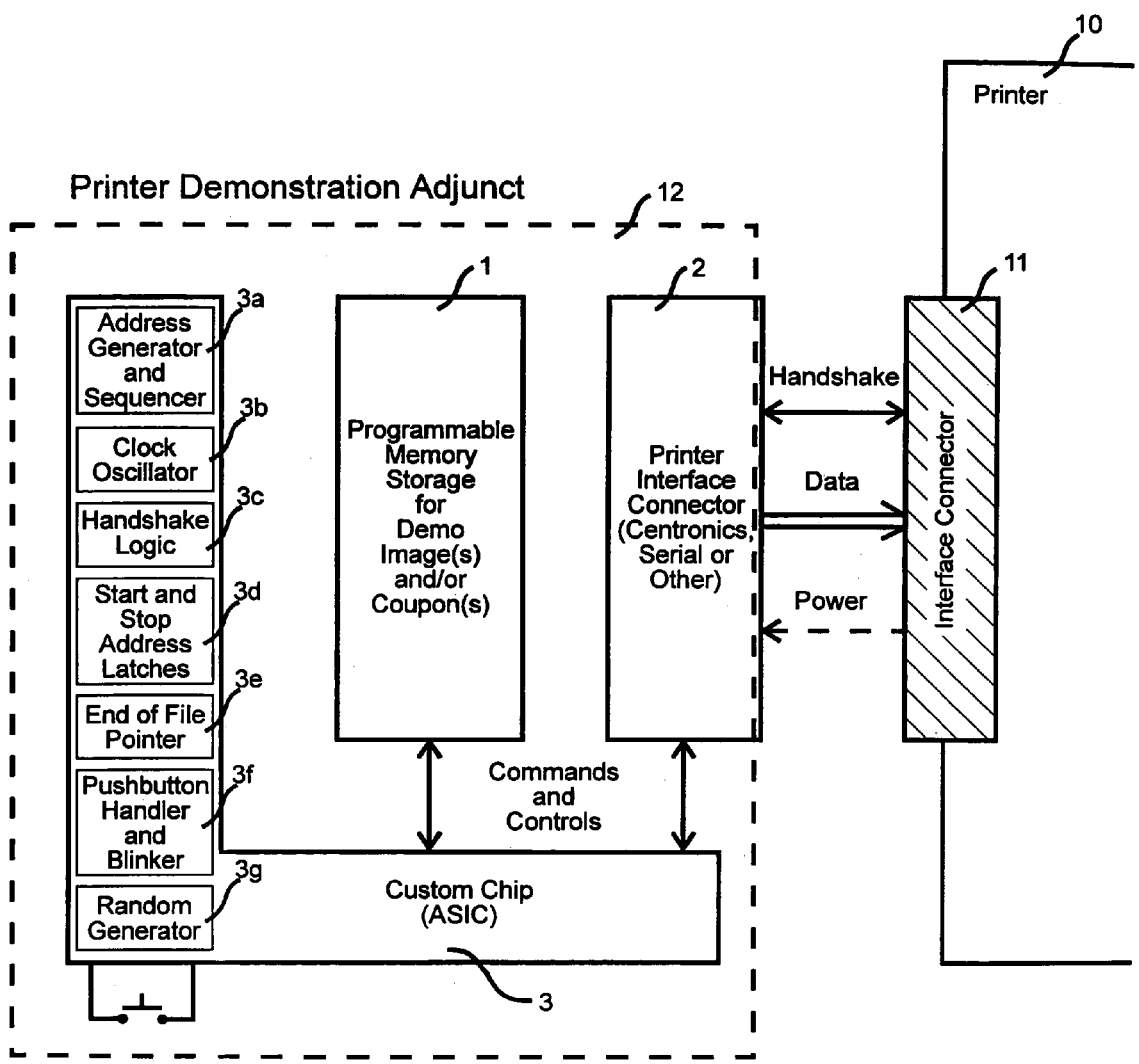
FIG. 1 is a schematic view of a printer with an interface and block diagram of the adjunct device of the present invention.

With specific reference to the drawings, in FIG. 1, a prior art printer 10 (of either the ink-jet or laser output variety) comprises a standard interface connector 11 (Centronics, Serial, etc., depending on the printer, with the specific type of connector being readily changeable and adaptable, i.e. a fungible connection). The adjunct device 12 of the present invention comprises a corresponding printer interface connector 2 for connection to interface connector 11 of the printer with a handshake protocol and data transmission and optionally with a source of power (though not shown, the adjunct device may separately comprise its own power source). As schematically shown, the adjunct device comprises programmable memory storage 1, which contains demonstration images and/or coupon type images for hard copy downloading via the connected printer. Custom chip 3 comprises the elements of address generator and sequencer 3a, clock oscillator 3b, handshake logic protocols 3c and start and stop address latches 3d. The chip is also integrated with random generator 3g, end of file pointer 3e and pushbutton handler and blinker 3f.

Figure 2:
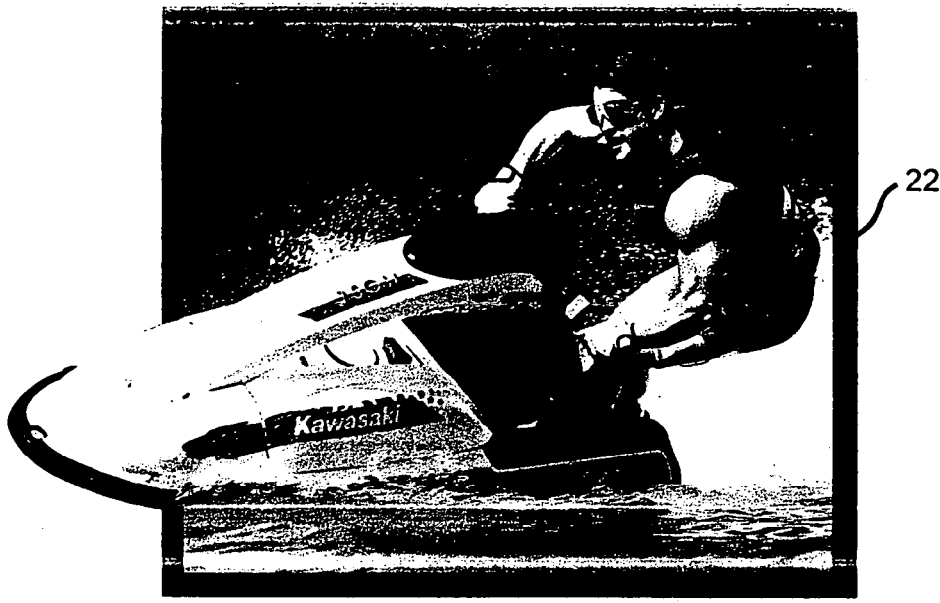
FIG. 2 is an illustrative example of a prior art demonstration printout.

As shown in FIG. 2 (usually presented in color with ink-jet printers to demonstrate color capability as well as sharpness of text and graphics) is a typical demonstration printout 20 for an Epson® ink jet printer demonstrating actual output of text 21 with details of printer capability and graphic images 22. Once the text, images and information of the printout 20 are assimilated the sheet is often discarded.

Figure 3:
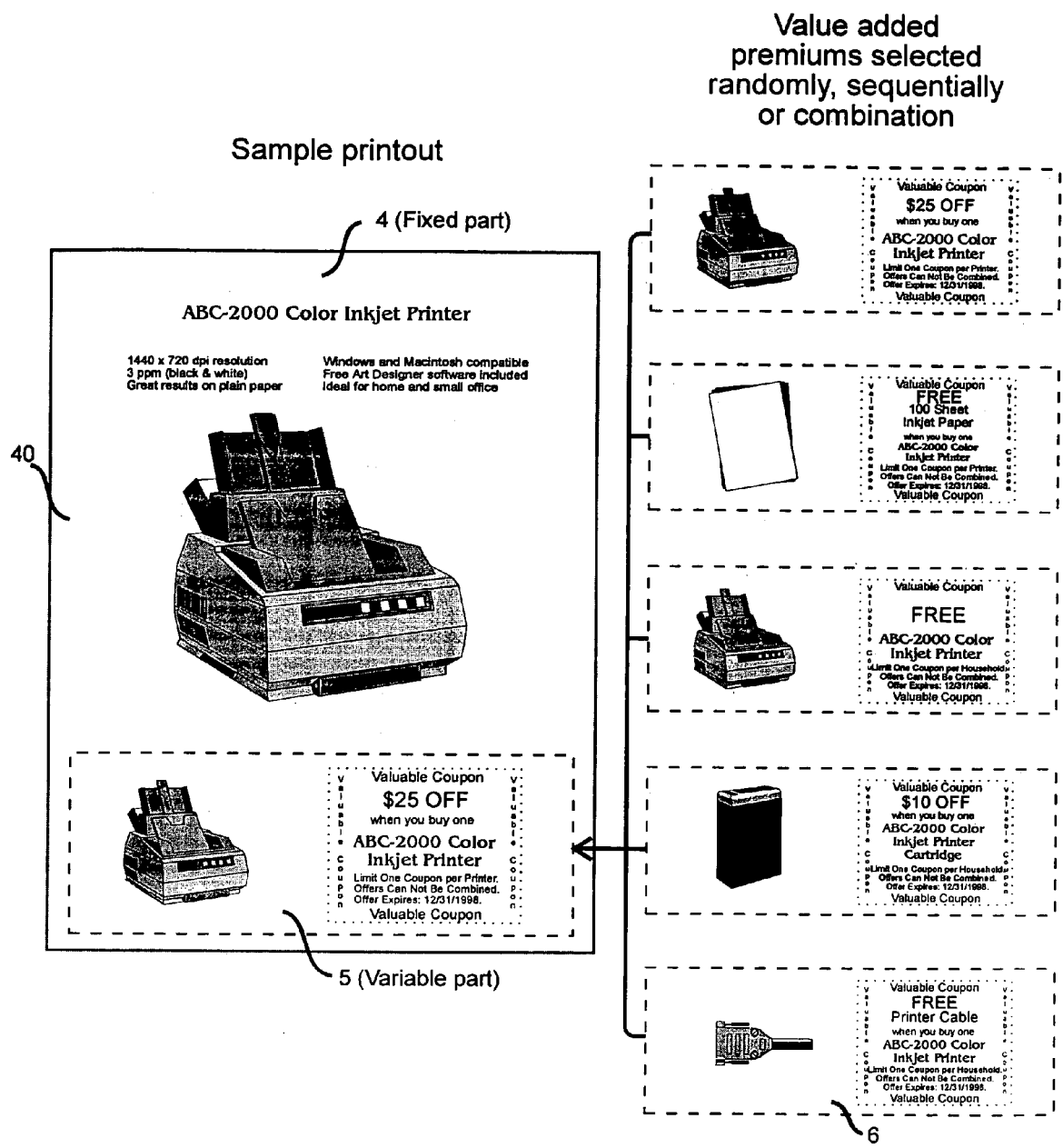
FIG. 3 shows a demonstration printout generated by the printer as controlled with the device of the present invention with randomly, sequentially or combination selected different value added premiums printed thereon.

As shown in FIG. 3, printout 40 is comprised of two parts, a fixed demonstration part 4, which demonstrates operation of the printer with appropriate informative text, and a variable value added portion 5 which is randomly selected from programmable storage 1 of premium options 6, via the random generator 3g.

As a result, a potential consumer retains the printout 40 far longer than the simple informative printout of the prior art, with resultant increased recognition of the specific printer and source company.

Figure 4:
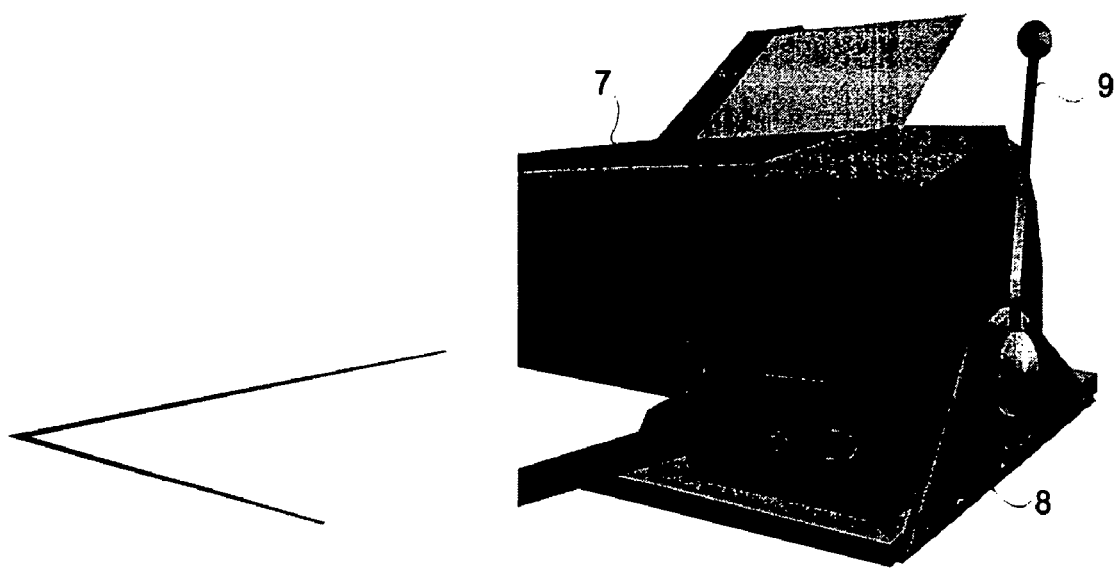
FIG. 4 depicts a printer with demonstration activation effected by a pull lever similar to those used in slot machines to generate the demonstration printouts shown in FIG. 3.

In the embodiment shown in FIG. 4, an additional element of interest is added to a demonstration printout of a printer wherein the printer 7 is configured with an activation mechanism 8 which comprises a pull down lever 9, similar to that of a slot machine wherein various pulls of the lever provide demonstration copies with randomly selected printouts as shown in FIG. 3.

It is understood that the above description and drawings are simply illustrative of the present invention and that changes may be made in the adjunct device and connection as well as the format of the printouts and the like without departing from the scope of the present invention as defined in the following claims.

What is claimed is:

1. A printer demonstration adjunct device adapted for connection to an input interface of a printer, wherein the adjunct device comprises: a) memory means containing programmed printer demonstration images and text, with said memory means further containing text for at least one separate value added offer; b) logic means, comprising means for causing the printer to link and printout from the memory means the demonstration images and text together with said at least one separate value added offer wherein the memory means contains text for at least two separate value added offers; and wherein the means for causing the printer to link and printout from the memory means, comprises an address generator and sequencer, a clock oscillator, and handshake logic adapted for a specific printer to which the device is connected; and wherein the device further comprises random or sequential generation means which couples a printout from the printer of the demonstration images and text with a randomly or sequentially selected text selected from the at least two separate value added offers.

2. The adjunct device of claim 1, wherein said memory means comprises a memory module removable from the device arid having interface means for connection to a control input of the printer.

3. The adjunct device of claim 1, wherein the memory means is integral with the device and is variably programmable therein.

4. The adjunct device of claim 1 wherein the interface means comprises means capable of effecting power diversion from the printer to the device for the powering of the device.

5. The adjunct device of claim 1, wherein the demonstration images and text and the text for at least two separate value added offers are controlled to be printed on a single sheet.

6. The adjunct device of claim 1, wherein the demonstration images and text and the text for at least two separate value added offers are controlled to be printed on separate sheets.

7. The adjunct device of claim 1, wherein the device further comprises activation control means for said printer for the printing of the demonstration text and images, with said activation control means comprising a pull down lever.

* * * * *